(12) United States Patent
Sun et al.

(10) Patent No.: US 12,013,726 B2
(45) Date of Patent: Jun. 18, 2024

(54) SUPPORT STRUCTURE FOR FLEXIBLE PANEL, DISPLAY DEVICE AND METHOD FOR ASSEMBLING FLEXIBLE MODULE

(71) Applicant: BOE TECHNOLOGY GROUP CO., LTD., Beijing (CN)

(72) Inventors: Baofeng Sun, Beijing (CN); Meiling Gao, Beijing (CN); Yanli Wang, Beijing (CN); Bo Wang, Beijing (CN); Wei Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 282 days.

(21) Appl. No.: 17/309,752

(22) PCT Filed: Sep. 7, 2020

(86) PCT No.: PCT/CN2020/113706
§ 371 (c)(1),
(2) Date: Jun. 17, 2021

(87) PCT Pub. No.: WO2022/047771
PCT Pub. Date: Mar. 10, 2022

(65) Prior Publication Data
US 2022/0308631 A1 Sep. 29, 2022

(51) Int. Cl.
*G06F 1/16* (2006.01)
(52) U.S. Cl.
CPC .......... *G06F 1/1652* (2013.01); *G06F 1/1656* (2013.01)
(58) Field of Classification Search
CPC ...... G06F 1/1652; G06F 1/1656; G09F 9/301; H01L 27/1259; H05K 7/00; H10K 77/111; H10K 71/00
See application file for complete search history.

(56) References Cited

U.S. PATENT DOCUMENTS

2014/0209360 A1* 7/2014 Peng ................ G09F 13/22
174/254
2019/0163233 A1* 5/2019 Rappoport ............ G06F 1/1637
2020/0020754 A1 1/2020 Kim et al.
(Continued)

FOREIGN PATENT DOCUMENTS

| CN | 108766247 A | 11/2018 |
| CN | 110718146 A | 1/2020 |
| CN | 110767096 A | 2/2020 |

OTHER PUBLICATIONS

Schnabelrauch, iPhone 12 mini Screen Replacement, May 3, 2023, https://www.ifixit.com/Guide/iPhone+12+mini+Screen+Replacement/140482 (Year: 2023).*

*Primary Examiner* — Rockshana D Chowdhury
*Assistant Examiner* — Martin Antonio Asmat Uceda
(74) *Attorney, Agent, or Firm* — BROOKS KUSHMAN P.C.

(57) ABSTRACT

A support structure for a flexible panel. The flexible panel includes a non-bending area, a bending area and a pad area arranged in sequence along a first direction. The pad area is located at a backlight side of the non-bending area. The support structure includes a support plate, and the support plate includes a planar support area attached to the non-bending area and a patterned area at least attached to the bending area. The present disclosure further provides a method for assembling a flexible module, and a display device.

11 Claims, 3 Drawing Sheets

(56) References Cited

U.S. PATENT DOCUMENTS

2020/0136066 A1\* 4/2020 Jin ..................... G06F 3/04164
2020/0209687 A1\* 7/2020 Yan ................... G02F 1/133308
2021/0153363 A1 5/2021 Cao et al.

\* cited by examiner

SUPPORT STRUCTURE FOR FLEXIBLE PANEL, DISPLAY DEVICE AND METHOD FOR ASSEMBLING FLEXIBLE MODULE

CROSS-REFERENCE TO RELATED APPLICATION

This application is the U.S. national phase of PCT Application No. PCT/CN2020/113706 filed on Sep. 7, 2020, which is incorporated herein by reference in its entirety.

TECHNICAL FIELD

The present disclosure relates to the manufacture of a display product, in particular to a support structure for a flexible panel, a display device and a method for assembling a flexible module.

BACKGROUND

A flexible screen module consists of various functional films laminated one on another. Each functional film is soft and has poor pressure resistance, and it is weakest particularly at a position where a pad bending process is performed. At present, a rigid cover plate is adopted by a popular mobile phone with a curved-surface screen or a popular mobile phone with a waterfall screen in the market, and a curved-surface pad bending process is performed in conjunction with a three dimensional (3D) laminating scheme. However, with the popularity of mobile phones having a foldable screen, it is necessary to perform the curved-surface pad bending process on the foldable screen, so as to provide the mobile phone with a curved-surface edge. A material of the cover plate of the module, i.e., hardened glass, is replaced with a flexible film material such as polyimide (PI) or polyethylene terephthalate (PET), so for the flexible module on which the pad bending process has been performed, the cover plate is easily separated from an Optically Clear Adhesive (OCA) under the cover plate, and thereby the yield of the flexible screen is adversely affected.

SUMMARY

An object of the present disclosure is to provide a support structure for a flexible panel, a display device and a method for assembling a flexible module, so as to prevent the yield from being adversely affected when an OCA between a flexible cover plate and a flexible screen is easily separated from the flexible screen.

In one aspect, the present disclosure provides in some embodiments a support structure for a flexible panel. The flexible panel includes a non-bending area, a bending area and a pad area arranged in sequence along a first direction. The pad area is located at a backlight side of the non-bending area. The support structure includes a support plate, and the support plate includes a planar support area attached to the non-bending area and a patterned area at least attached to the bending area.

In a possible embodiment of the present disclosure, the support structure is applied to a display device including the flexible panel. The support plate includes a first side and a second side arranged opposite to each other in a second direction. A connection structure is arranged at each of the first side and the second side and coupled to a corresponding side of the display device, and the second direction is perpendicular to the first direction.

In a possible embodiment of the present disclosure, the connection structure includes a first connection portion formed through extending the first side in a direction away from the second side and a second connection portion formed through extending the second side in a direction away from the first side.

In a possible embodiment of the present disclosure, the connection structure includes a first connection portion located at the first side and a second connection portion located at the second side, the first connection portion is formed by bending the first side along a direction perpendicular to the support plate and bending the first side again in a direction away from the second side, and the second connection portion is formed by bending the second side along the direction perpendicular to the support plate and bending the second side again in a direction away from the first side.

In a possible embodiment of the present disclosure, the first connection portion includes a first connection sub-portion and a second connection sub-portion spaced apart from each other along the first direction, a length of the first connection sub-portion in the second direction is less than or equal to a length of a plate area in the second direction, and a length of the second connection sub-portion in the second direction is less than or equal to a bending length of the bending area. The second connection portion includes a third connection sub-portion and a fourth connection sub-portion spaced apart from each other along the first direction, the third connection sub-portion has a same structure as the first connection sub-portion, and the fourth connection sub-portion has a same structure as the second connection sub-portion.

In a possible embodiment of the present disclosure, the patterned area is provided with a plurality of through holes arranged in an array form along the first direction.

In a possible embodiment of the present disclosure, each through hole is a strip-shaped through hole extending along a second direction, and the second direction is perpendicular to the first direction.

In a possible embodiment of the present disclosure, the patterned area is a flat structure located on a same plane as the planar support area, or the patterned area at least includes a corresponding bending portion that matches a bending degree of the bending area of the flexible panel.

In another aspect, the present disclosure provides in some embodiments a display device, including a flexible panel and the above-mentioned support structure for the flexible panel.

In a possible embodiment of the present disclosure, the support plate includes a first side and a second side arranged opposite to each other in a second direction. A connection structure is arranged at each of the first side and the second side and coupled to a corresponding side of the display device, and the second direction is perpendicular to the first direction. The display device further includes a frame configured to carry the flexible panel and provided with a corresponding connection structure fit to the connection structure.

In yet another aspect, the present disclosure provides in some embodiments a method for assembling a flexible module, including: providing a flexible panel in a flat state and the above-mentioned support structure for the flexible panel, the flexible panel including a non-bending area, a to-be-bent area and a pad area, the planar support area and the patterned area of the support plate of the support structure being located on a same plane; and integrally bending the to-be-bent area of the flexible panel and a portion of the support plate corresponding to the to-be-bent area so that the pad area of the flexible panel is located at a backlight side of the non-bending area.

In still yet another aspect, the present disclosure provides in some embodiments a method for assembling a flexible module, including: providing a flexible panel and the above-mentioned support structure for the flexible panel, the support plate of the support structure including a planar support area attached to the non-bending area and a patterned area at least attached to the bending area; and attaching the non-bending area of the flexible panel to the planar support area of the support plate and attaching the bending area of the flexible panel to a portion of the patterned area corresponding to the bending area, so as to assemble the flexible panel with the support plate.

The present disclosure has the following beneficial effect. Through the patterned area, it is able to reduce a bending stress of the support structure and prevent the occurrence of delamination for the flexible module, thereby to improve the yield.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the embodiments of the present disclosure, it should be appreciated that, such words as "in the middle of", "on/above", "under/below", "left", "right", "vertical", "horizontal", "inside" and "outside" may be used to indicate directions or positions as viewed in the drawings, and they are merely used to facilitate the description in the present disclosure, rather than to indicate or imply that a device or member must be arranged or operated at a specific position. In addition, such words as "first", "second" and "third" may be merely used to differentiate different components rather than to indicate or imply any importance.

In recent years, full-screen display devices have attracted more and more attention. For an Organic Light-Emitting Diode (OLED) display panel, a binding area of a flexible substrate on which a control chip is bound is bent to be in back of the display panel through a pad bending technology, so as to achieve a full-screen effect. When bending the binding area to be in the back of the display panel, a bending area may occur between the binding area and a display area.

Figure 1:
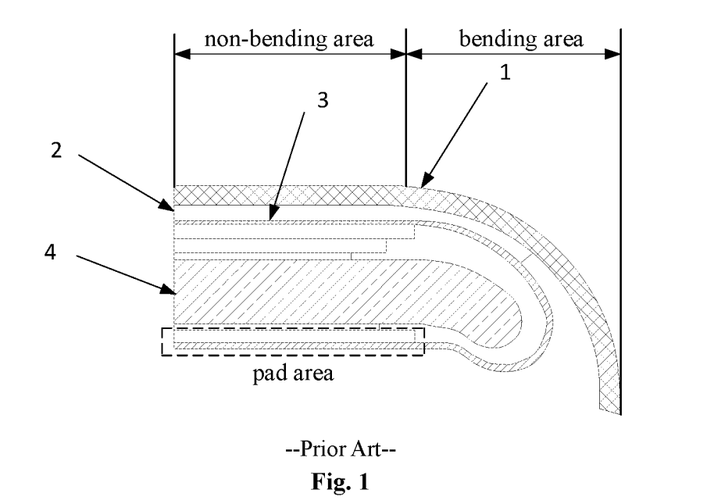
FIG. 1 is a schematic view of a conventional flexible module.

A flexible display module consists of various functional films laminated one on another. As shown in FIG. 1, the flexible display module includes a cover plate 1, a flexible screen 3, and an OCA 2 arranged between the cover plate 1 and the flexible screen 3. A support steel sheet 4 is arranged at a side of the flexible screen 3 away from the cover plate 1. A material of the cover plate 1, i.e., hardened glass, is replaced with a flexible film material such as PI or PET which is soft and has poor pressure resistance, so wirings of a flexible printed circuit (FPC) or a pad bending structure at a peripheral area of the flexible screen 3 may be bent to a backlight side, and a clearance needs to be provided for structural components of the module. In the bending area, due to insufficient support, the cover plate 1 may be excessively depressed and the bending area of the flexible screen 3 may be damaged in a pressing procedure. In order to provide a terminal with a curved-surface edge, a curved-surface pad bending process needs to be performed on the flexible screen 3. In related art, a 3D support steel sheet at a fixed curvature is added at a position where the pad bending process is to be performed, and then the curved-surface pad bending process is performed in conjunction with a 3D laminating scheme. However, the OCA 2 under the cover plate 1 is easily separated from the cover plate. It is found after study that, when the pad bending process is performed at the position where the support steel sheet 4 at the fixed curvature is added, a rebound force is too large, and thereby delamination may occur for the module.

In order to solve the above problem, the present disclosure provides in some embodiments a support structure for a flexible panel. As shown in FIGS. 2 to 5, the flexible panel includes a non-bending area, a bending area and a pad area arranged in sequence along a first direction. The pad area is located at a backlight side of the non-bending area. The support structure includes a support plate, and the support plate includes a planar support area 10 attached to the non-bending area and a patterned area 20 at least attached to the bending area.

Figure 2:
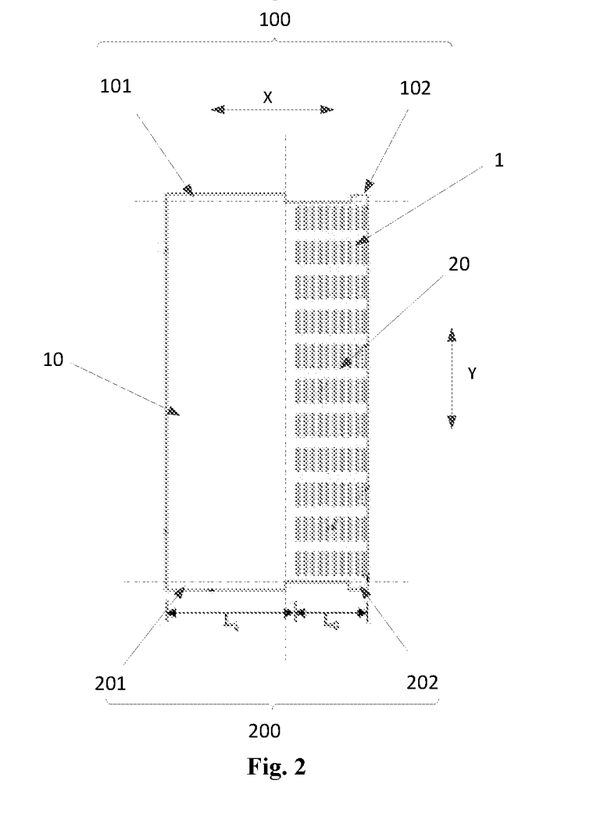
FIG. 2 is a schematic view of a support plate according to one embodiment of the present disclosure.

The planar support area 10 and the patterned area 20 may be sequentially arranged along the first direction (referring to a direction X in FIG. 2). The planar support area 10 may correspond to the non-bending area of the flexible panel, so it is unnecessary to pattern the planar support area, and thereby it is able to ensure support strength. As compared with an overall solid plate-like structure, the patterned area 20 at least corresponding to the bending area of the flexible panel is easy to be bent, so it is able to reduce a bending stress for the support plate as well as a rebound force, thereby to prevent the cover plate from being easily separated from an OCA.

A size of the patterned area 20 may be set according to the practical need, as long as it may fully cover the bending area of the flexible panel after the assembling, so as to prevent the occurrence of the delamination for a module.

In some embodiments of the present disclosure, in order to ensure the support strength of the support plate, it is necessary to merely pattern a portion corresponding to the bending area of the flexible panel.

Referring to FIG. 2, in a possible embodiment of the present disclosure, a length of the planar support area 10 in the first direction (direction X) may be Li, a length of the patterned area 20 in the first direction may be Lo, Li may be less than or equal to a length of the non-bending area of the flexible panel in the first direction, and Lo may be greater than or equal to the length of the bending area of the flexible panel in the first direction.

There is a relatively large difference between a stress of the patterned area 20 and a stress of the planar support area 10. When a boundary between the patterned area 20 and the planar support area 10 is arranged in such a manner as to directly face a boundary between the non-bending area and the bending area of the flexible panel, the support plate may easily be broken due to the stress difference. In some embodiments of the present disclosure, in order to reduce the stress difference, a size of the patterned area 20 may be larger than that of the bending area of the flexible panel, i.e., after the support plate has been attached to the flexible panel, the patterned area 20 may include a portion attached to a part of the non-bending area, and the boundary between the patterned area 20 and the planar support area 10 may be located at the non-bending area of the flexible panel, so as to prevent the support plate from being broken.

In a possible embodiment of the present disclosure, a portion of the support plate corresponding to the flexible panel may be in a bending state, and a curvature of the portion may be the same as a curvature of the flexible panel. During the assembling, the flexible panel may be directly attached to the support plate by means of the OCA or the like.

Figure 4:
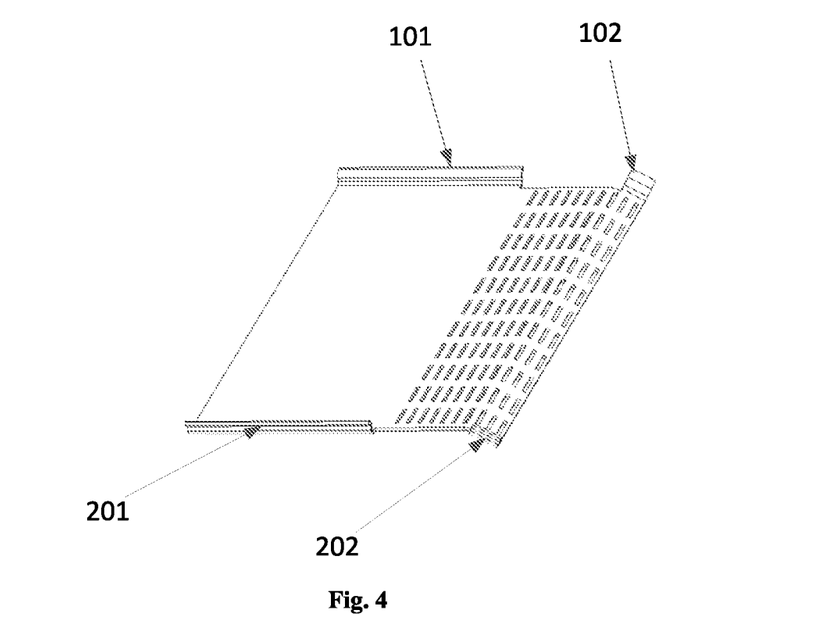
FIG. 4 is yet another schematic view of the support plate according to one embodiment of the present disclosure.

FIG. 4 shows the support plate in the bending state. Based on the above scheme, it is necessary to perform a bending process on the flexible panel separately, and perform a bending process on the support plate separately, and then attach the flexible panel in the bending state to the support plate in the bending state.

In a possible embodiment of the present disclosure, the support plate may be in a flat state as a whole, i.e., before assembling it with the flexible panel, the support plate may be of a planar structure. The planar support area 10 and the patterned area 20 may be located on a same plane, and the patterned area 20 may not be in a bending state to match the bending area of the flexible panel.

Figure 3:
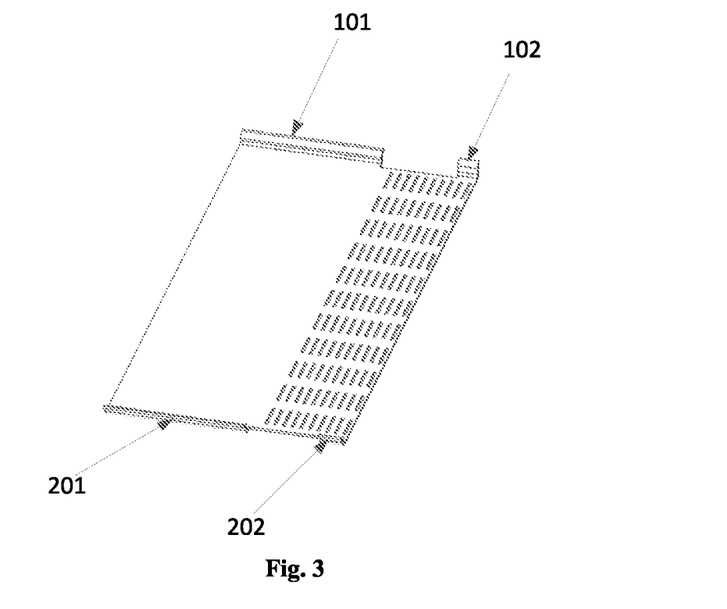
FIG. 3 is another schematic view of the support plate according to one embodiment of the present disclosure.
Figure 5:
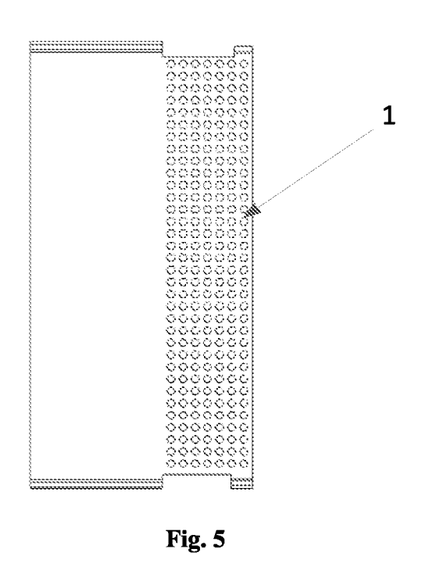
FIG. 5 is still yet another schematic view of the support plate according to one embodiment of the present disclosure.

FIGS. 2, 3 and 5 show the support plate in the flat state.

Based on the above scheme, because it is easy to bend the support plate, it is able to provide the support plate in the flat state rather than the bending state (at a fixed curvature) during the manufacture and transportation of the module.

During the assembling, the flexible panel in the flat state may be provided, i.e., the flexible panel may also be in the flat state before assembling it with the support plate. The flexible panel may include the non-bending area, a to-be-bent area (after the flexible panel has been bent, the to-be-bent area may form the bending area) and the pad area. The flexible panel in the flat state may be attached to the support plate in the flat state, and then they may be bent as a whole. The support plate may be attached to the flexible panel through a plane fit process, so as to improve the manufacture process as well as the transportation of the flexible display module.

In a word, as compared with the support plate in a bending state, when the support plate is in the flat state, it is able to improve the transportation of the module and simplify the manufacture process. In addition, as compared with a curved-surface fit process, through the plane fit process, it is able to reduce a difficulty in the attachment. In a possible embodiment of the present disclosure, the support plate may be, but not limited to, in the flat state as a whole.

In a possible embodiment of the present disclosure, the support plate may include a first side and a second side arranged opposite to each other in a second direction. A connection structure may be arranged at each of the first side and the second side and coupled to a corresponding side of a display device, and the second direction may be perpendicular to the first direction.

Through the connection structure, it is able to increase connection strength between the support structure and the display device.

In a possible embodiment of the present disclosure, the connection structure may include a first connection portion 100 formed through extending the first side in a direction away from the second side and a second connection portion 200 formed through extending the second side in a direction away from the first side.

The first connection portion 100 may be formed integrally with the support plate, and the second connection portion 200 may be formed integrally with the support plate.

The first connection portion 100 may be located on a same plane as the support plate and may be directly inserted into a corresponding groove in a frame of the display device (the groove may be of a built-in structure to prevent the other components of the display device from being interfered). The second connection portion 200 may have a same structure as the first connection portion 100. The first connection portion 100, the support plate, and the second connection portion 200 may be located on a same plane. The second connection portion 200 may be directly inserted into a corresponding groove in the frame of the display device, so as to facilitate the assembling of the support plate with the frame of the display device.

In a possible embodiment of the present disclosure, the connection structure may include the first connection portion 100 located at the first side and the second connection portion 200 located at the second side, the first connection portion 100 may be formed by bending the first side along a direction perpendicular to the support plate and bending the first side again in a direction away from the second side, and the second connection portion 200 may be formed by bending the second side along the direction perpendicular to the support plate and bending the second side again in a direction away from the first side.

The first connection portion 100 may be formed by extending the first side of the support plate outward and bending the first side multiple times, so as to increase connection strength between the first connection portion 100 and the frame of the display device. Identically, the second connection portion 200 may be formed by extending the second side of the support plate and bending the second side multiple times, so as to increase connection strength between the second connection portion 200 and the frame of the display device.

The first connection portion 100 may be of an L-like shape formed by bending the first side along the direction perpendicular to the support plate and bending it again in the direction away from the second side, or an S-like shape formed by extending the first side outward (in the direction away from the second side), then bending it along the direction perpendicular to the support plate, and then bending it again in the direction away from the second side, or any other shape, which will not be particularly defined herein.

In the embodiments of the present disclosure, in order to apply a uniform force to the first side and the second side of the support plate, the first connection portion 100 may have a same structure as the second connection portion 200.

In a possible embodiment of the present disclosure, the first connection portion 100 may include a first connection sub-portion 101 and a second connection sub-portion 102 spaced apart from each other along the first direction, a length of the first connection sub-portion 101 in the second direction may be less than or equal to that of a plate area in the second direction, and a length of the second connection sub-portion 102 in the second direction may be less than or equal to a bending length of the bending area.

The second connection portion 200 may include a third connection sub-portion 201 and a fourth connection sub-portion 202 spaced apart from each other along the first direction, the third connection sub-portion 201 may have a same structure as the first connection sub-portion 101, and the fourth connection sub-portion 202 may have a same structure as the second connection sub-portion 102.

When the first connection portion 100 includes the first connection sub-portion 101 and the second connection sub-portion 102 spaced apart from each other, and the second connection portion 200 includes the third connection sub-portion 201 and the fourth connection sub-portion 202 spaced apart from each other, it is able to facilitate the bending of the support plate.

The first connection portion 100 may be arranged along the first direction (an extension direction of the support plate), the second connection portion 200 may be arranged along the first direction (the extension direction of the support plate), and the corresponding groove in the frame of the display device may be of a strip-shaped structure along the first direction. Hence, the first connection portion 100 and its corresponding groove in the display device may form a guide rail structure, and the second connection portion 200 and its corresponding groove in the display device may form a guide rail structure, so as to enable the support plate to slide along the first direction. The support plate may slide when bending the flexible panel, and the first connection portion 100 and the second connection portion 200 may function as to guide and stop the support plate, so as to improve the yield of the product.

In the embodiments of the present disclosure, the first connection sub-portion 101 and the third connection sub-portion 201 may correspond to the planar support area 10, and their lengths may be set according to the practical need, e.g., the length may be less than or equal to a length of the planar support area 10 in the first direction. The second connection sub-portion 102 and the fourth connection sub-portion 202 may be located in the patterned area 20. In order to facilitate the sliding when bending the flexible panel, a length of each of the second connection sub-portion 102 and the fourth connection sub-portion 202 may be smaller than a length of the patterned area 20, e.g., the length of each of the second connection sub-portion 102 and the fourth connection sub-portion 202 in the first direction may be, but not limited to, 1 mm to 10 mm.

It should be appreciated that, after the assembling, both the flexible panel and the support plate may be in the bending state, so the second connection sub-portion 102 and the corresponding groove in the frame of the display device may be in the bending state, and the fourth connection sub-portion 202 and the corresponding groove in the frame of the display device may also be in the bending state. A specific bending shape may be set according to the practical need.

In a possible embodiment of the present disclosure, the patterned area 20 may be provided with a plurality of through holes 1 arranged in an array form along the first direction. A column direction of the through holes 1 may be perpendicular to the first direction.

Each through hole 1 may be of various shapes, such as circular (referring to FIG. 5), oval, etc. The through holes 1 may also be arranged in various modes, for example, the through holes 1 in two adjacent columns may be arranged in a staggered manner, or arranged directly opposite to each other.

In a possible embodiment of the present disclosure, each through hole 1 may be a strip-shaped through hole extending along a second direction (referring to a direction Y in FIG. 2), and the second direction may be perpendicular to the first direction.

In a possible embodiment of the present disclosure, a width of each strip-shaped through hole in the first direction (referring to the direction X in FIG. 2) may be, but not limited to, 0.1 mm to 0.8 mm, and a length of each strip-shaped through hole in the second direction may be, but not limited to, 1 mm to 6 mm.

A bending axis of the support plate may extend along the second direction, and each through hole 1 may be a stripe-shaped through hole extending along the second direction, so as to facilitate the bending of the support plate and reduce the bending stress.

In the embodiments of the present disclosure, two end portions of each stripe-shaped through hole 1 may be semi-elliptical along the extending direction (referring to the direction Y in FIG. 2).

In a possible embodiment of the present disclosure, the patterned area 20 may be a flat structure located on a same plane as the planar support area 10, or the patterned area 20 may at least include a corresponding bending portion that matches a bending degree of the bending area of the flexible panel.

The support plate may be in the flat state as a whole, then attached to the flexible panel in the flat state through a plane fit process, and then bent as a whole. The support plate may also be in the bending state in accordance with the bending state of the flexible panel and then directly attached to the flexible panel in the bending state. In actual use, the state of the support plate may be selected according to the practical need. In a possible embodiment, before the assembling, the support plate may be, but not limited to, in the flat state.

The present disclosure further provides in some embodiments a display device, which includes a flexible panel and the above-mentioned support structure for the flexible panel.

In a possible embodiment of the present disclosure, the support plate may include a first side and a second side arranged opposite to each other in a second direction. A connection structure may be arranged at each of the first side and the second side and coupled to a corresponding side of the display device, and the second direction may be perpendicular to the first direction. The display device may further include a frame configured to carry the flexible panel and provided with a corresponding connection structure fit to the connection structure.

In some embodiments of the present disclosure, the frame may surround the flexible panel, and a corresponding connection structure (a second connection structure) may be arranged on each of two opposite side walls of the frames and coupled to the connection structure of the support plate (a first connection structure). The second connection structure on the frame may include a first portion and a second portion. The first portion may be a built-in groove arranged along the first direction, and it may include a first sub-portion fit to the first connection sub-portion and a second sub-portion fit to the third connection sub-portion. The second portion may be an arc-shaped built-in groove at a same curvature as a curvature of the bending area of the flexible panel, and it may include a third sub-portion fit to the second connection sub-portion and a fourth sub-portion fit to the fourth connection sub-portion.

The corresponding connection structure on the frame may be fit to the connection structure on the support plate, and it may be equivalent to a guide rail, so as to guide and stop the support plate when the support plate slides during the bending, thereby to the yield of the product.

The present disclosure further provides in some embodiments a method for assembling a flexible module, applied to the above-mentioned support structure for a flexible panel, which includes: providing the flexible panel in a flat state and the support structure with the support plate, the flexible panel including a non-bending area, a to-be-bent area and a pad area, the planar support area 10 and the patterned area 20 of the support plate being located on a same plane; and integrally bending the to-be-bent area of the flexible panel and a portion corresponding to the to-be-bent area of the support plate so that the pad area of the flexible panel is located at a backlight side of the non-bending area.

Based on the above scheme, because it is easy to bend the support plate, it is able to provide the support plate in the flat state rather than the bending state (at a fixed curvature) during the manufacture and transportation of the module.

During the assembling, the flexible panel in the flat state may be provided, i.e., the flexible panel may also be in the flat state before assembling it with the support plate. The flexible panel may include the non-bending area, a to-be-bent area (after the flexible panel has been bent, the to-be-bent area may form the bending area) and the pad area. The flexible panel in the flat state may be attached to the support plate in the flat state, and then they may be bent as a whole. The support plate may be attached to the flexible panel through a plane fit process, so as to improve the manufacture process as well as the transportation of the flexible display module. flexible panel The present disclosure further provides in some embodiments a method for assembling a flexible module, applied to the above-mentioned support structure for a flexible panel, which includes: providing a flexible panel and the support structure with a support plate, the flexible panel including a non-bending area, a bending area and a pad area, and the support plate including the planar support area 10 attached to the non-bending area and the patterned area 20 attached to the bending area; and attaching the non-bending area of the flexible panel to the planar support area 10 of the support plate and attaching the bending area of the flexible panel to a portion of the patterned area 20 corresponding to the bending area, so as to assemble the flexible panel with the support plate.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A support structure for a flexible panel, wherein the flexible panel comprises a non-bending area, a bending area and a pad area arranged in sequence along a first direction, the pad area is located at a backlight side of the non-bending area, and the support structure comprises a support plate, wherein the support plate comprises a planar support area attached to the non-bending area and a patterned area at least attached to the bending area:
wherein the support structure is applied to a display device comprising the flexible panel, the support plate comprises a first side and a second side arranged opposite to each other in a second direction, a connection structure is arranged at each of the first side and the second side and coupled to a corresponding side of the display device, and the second direction is perpendicular to the first direction;
wherein the connection structure comprises a first connection portion located at the first side and a second connection portion located at the second side, the first connection portion is formed by bending the first side along a direction perpendicular to the support plate and bending the first side again in a direction away from the second side, and the second connection portion is formed by bending the second side along the direction perpendicular to the support plate and bending the second side again in a direction away from the first side.

2. The support structure according to claim 1, wherein the connection structure comprises a first connection portion formed through extending the first side in a direction away from the second side and a second connection portion formed through extending the second side in a direction away from the first side.

3. The support structure according to claim 2, wherein the first connection portion comprises a first connection sub-portion and a second connection sub-portion spaced apart from each other along the first direction, a length of the first connection sub-portion in the second direction is less than or equal to a length of the support plate in the second direction, and a length of the second connection sub-portion in the second direction is less than or equal to a bending length of the bending area, wherein the second connection portion comprises a third connection sub-portion and a fourth connection sub-portion spaced apart from each other along the first direction, the third connection sub-portion has a same structure as the first connection sub-portion, and the fourth connection sub-portion has a same structure as the second connection sub-portion.

4. The support structure according to claim 1, wherein the patterned area is provided with a plurality of through holes arranged in an array form along the first direction.

5. The support structure according to claim 4, wherein each through hole is a strip-shaped through hole extending along a second direction, and the second direction is perpendicular to the first direction.

6. The support structure according to claim 1, wherein the patterned area is a flat structure located on a same plane as the planar support area, or the patterned area at least comprises a corresponding bending portion that matches a bending degree of the bending area of the flexible panel.

7. A display device, comprising a flexible panel and the support structure according to claim 1.

8. The display device according to claim 7, wherein the display device further comprises a frame configured to carry the flexible panel and provided with a corresponding connection structure fit to the connection structure.

9. A method for assembling a flexible module, comprising:
providing a flexible panel in a flat state and the support structure according to claim 1, the flexible panel comprising a non-bending area, a to-be-bent area and a pad area, the planar support area and the patterned area of the support plate of the support structure being located on a same plane; and
integrally bending the to-be-bent area of the flexible panel and a portion of the support plate corresponding to the to-be-bent area so that the pad area of the flexible panel is located at a backlight side of the non-bending area.

10. A method for assembling a flexible module, comprising:

providing a flexible panel and the support structure according to claim 1, the support plate of the support structure comprising a planar support area attached to the non-bending area and a patterned area at least attached to the bending area; and attaching the non-bending area of the flexible panel to the planar support area of the support plate and attaching the bending area of the flexible panel to a portion of the patterned area corresponding to the bending area, so as to assemble the flexible panel with the support plate.

11. The support structure according to claim 1, wherein the first connection portion comprises a first connection sub-portion and a second connection sub-portion spaced apart from each other along the first direction, a length of the first connection sub-portion in the second direction is less than or equal to a length of the support plate in the second direction, and a length of the second connection sub-portion in the second direction is less than or equal to a bending length of the bending area, wherein the second connection portion comprises a third connection sub-portion and a fourth connection sub-portion spaced apart from each other along the first direction, the third connection sub-portion has a same structure as the first connection sub-portion, and the fourth connection sub-portion has a same structure as the second connection sub-portion.

\* \* \* \* \*